UNITED STATES PATENT OFFICE.

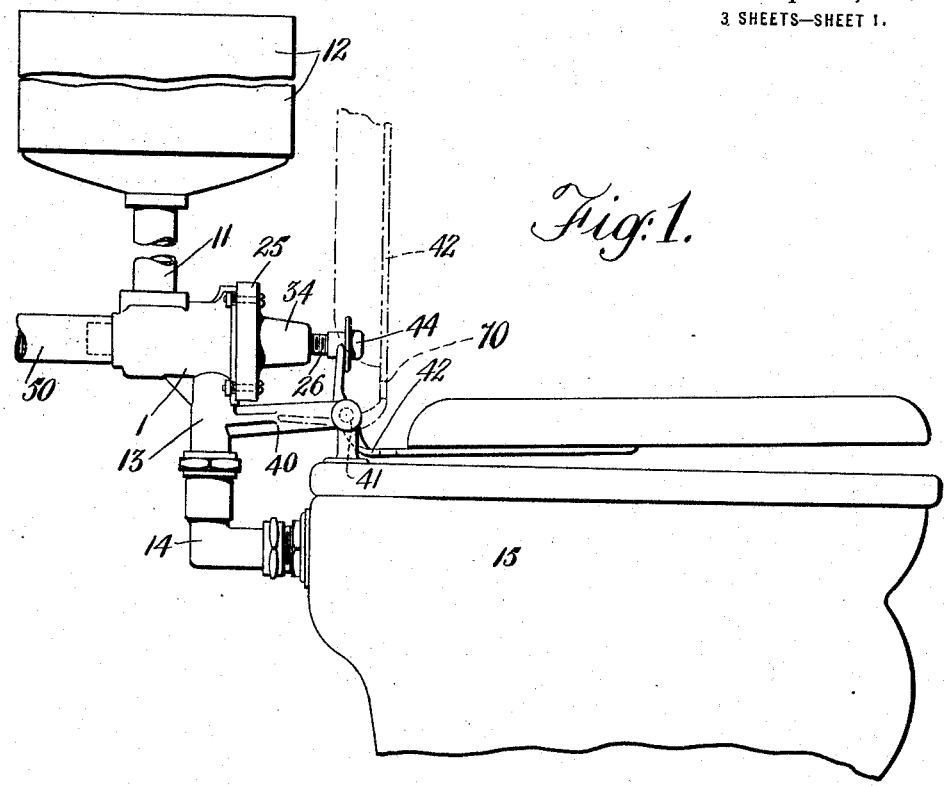
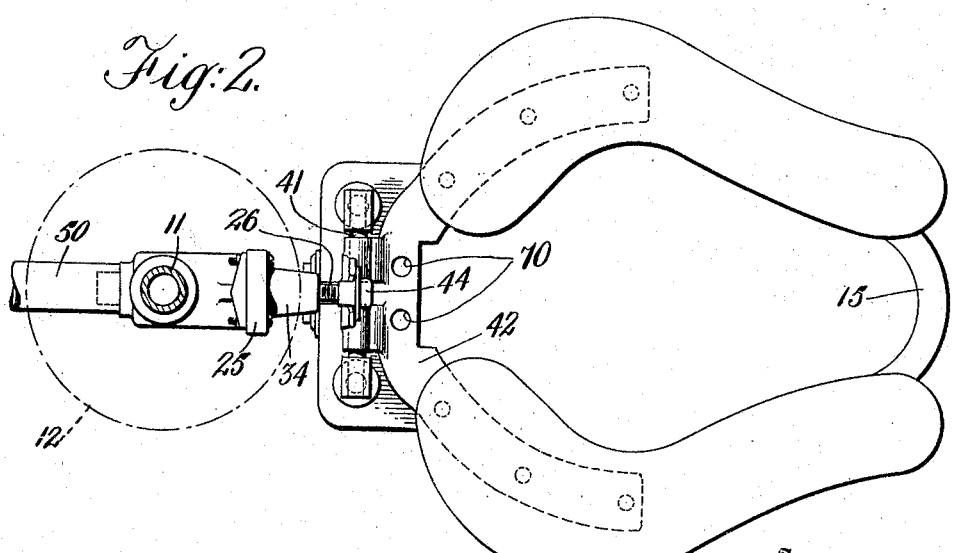

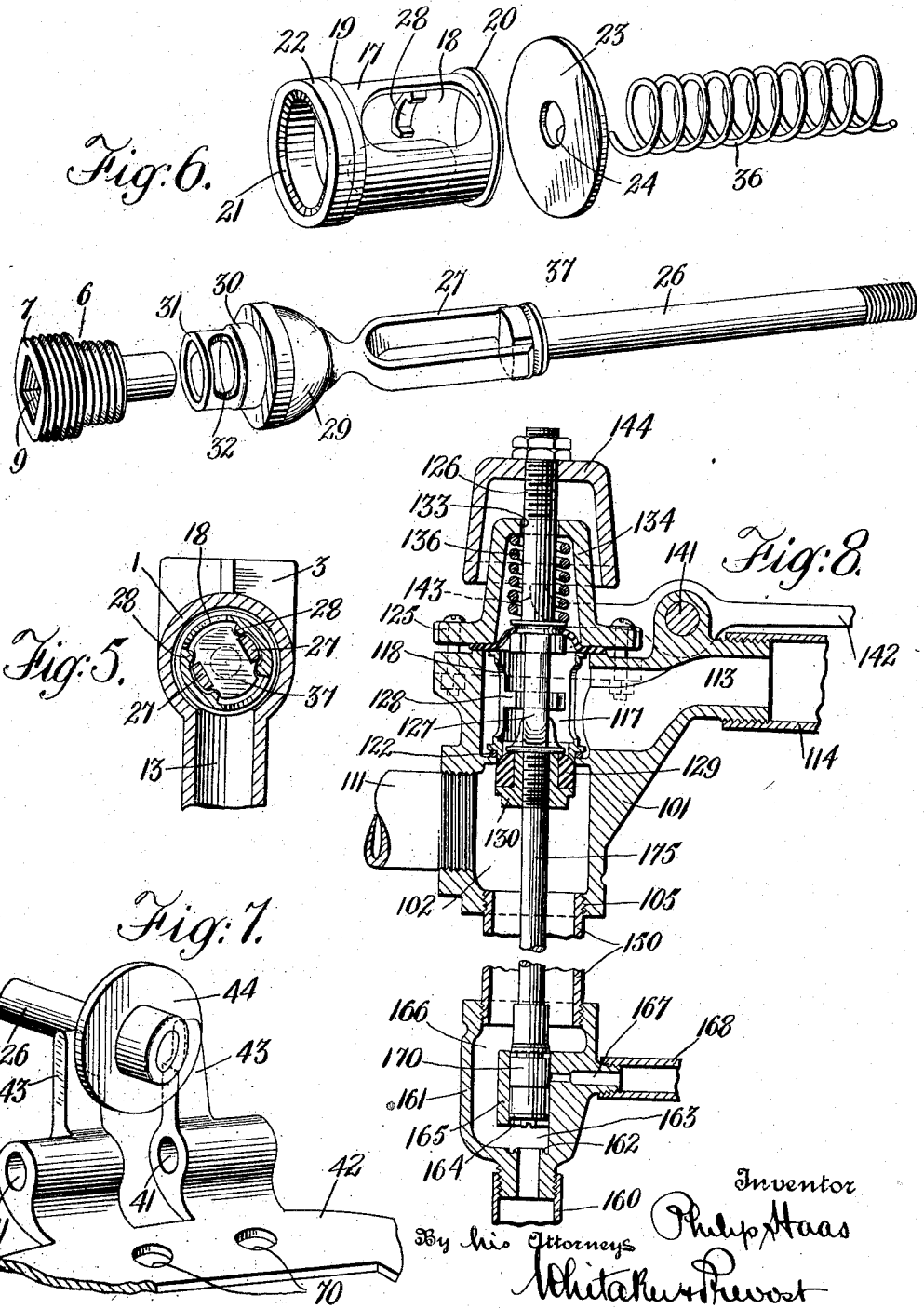

PHILIP HAAS, OF DAYTON, OHIO.

VALVE MECHANISM.

1,300,261.   Specification of Letters Patent.   Patented Apr. 15, 1919.

Application filed December 2, 1918. Serial No. 264,906.

*To all whom it may concern:*

Be it known that I, PHILIP HAAS, citizen of the United States, residing at Dayton, in the county of Montgomery and State of Ohio, have invented certain new and useful Improvements in Valve Mechanism; and I do hereby declare the following to be a full, clear, and exact description of the invention, such as will enable others skilled in the art to which it appertains to make and use the same.

My invention consists in the novel features hereinafter described, reference being had to the accompanying drawings which illustrate two forms in which I have contemplated embodying my invention and which have been selected by me for the purpose of illustrating same, and the said invention is fully disclosed in the following description and claims. Referring to the said drawings:

Figure 1 represents a partial side elevation of a closet bowl and flushing tank showing my improved valve mechanism installed in proper operative relation therewith.

Fig. 2 is a top plan view of the same with the tank removed.

Fig. 5 is a sectional view on the line 5—5 of Fig. 3, illustrating the manner in which the adjustment of the regulating sleeve in a rotary turn tends to throttle the discharge of the water from the valve mechanism.

Fig. 6 is a perspective view representing in detail the valve stem, the valves carried thereto, the regulating sleeve diaphragm and valve operating spring and the valve guiding and controlling device for the water inlet, as would appear in separated relation.

Fig. 7 is a detail of the seat hinge member.

Fig. 8 is a sectional view showing my invention embodied in a valve mechanism adapted especially for use in connection with "frost proof" hydrants and closets.

Figure 3:
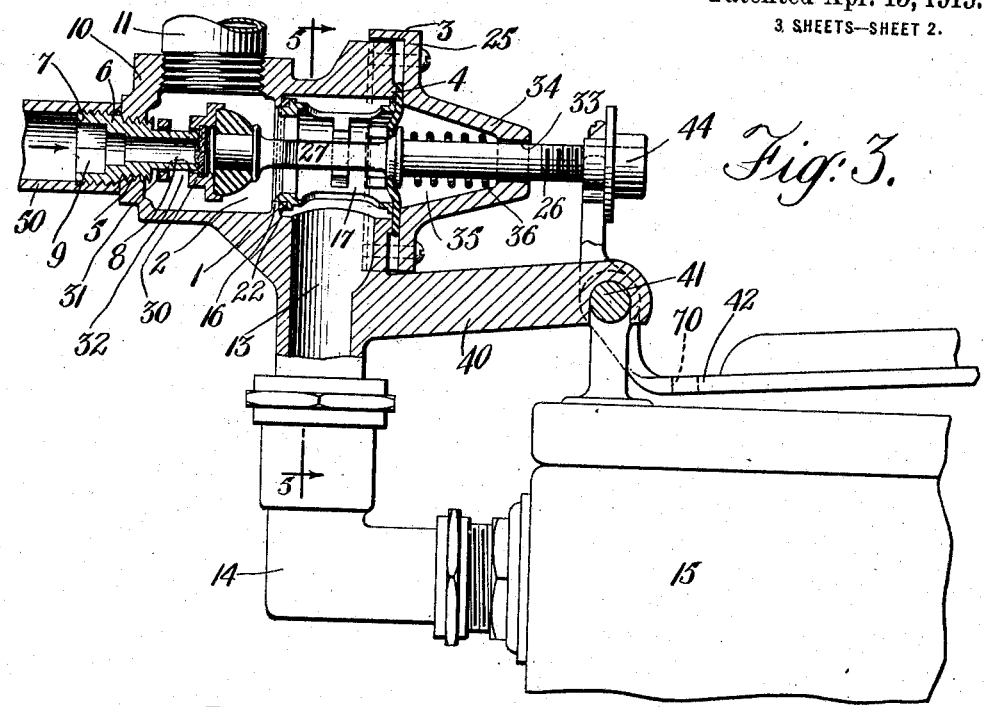
Fig. 3 is an enlarged sectional view of my improved valve mechanism shown in Figs. 1 and 2, and illustrating the adjacent parts of the bowl and seat, and showing the inlet valve in closed position and the outlet valve open.

The objects of my invention are to simplify the construction, diminish the cost and increase the efficiency of valve mechanism of the kind herein shown and described. To this end I form the valve body of cast metal, which may be ordinary cast iron, and arrange for the closing of the aperture at the end of the valve body where the valve stem enters by means of a clamping member fitting against a clamping face on the valve body and secured by bolts and nuts, or screws, very much after the manner of a flange union, thereby reducing the number of threaded parts in the construction. I also provide a removable and rotatably adjustable sleeve within the valve casing, held in its adjusted position by the said clamping member and provided internally with means for guiding the valve stem, said sleeve having a lateral discharge aperture adjacent to the discharge aperture of the valve casing so that by rotating the sleeve within the valve casing, more or less, the said sleeve will act to throttle the discharge of water through the valve mechanism. I also eliminate the usual stuffing box with its attendant expense and provide a diaphragm of rubber or other suitable material which is clamped between the clamping member and the valve body and through which the valve stem extends, and the usual spring for operating the valve stem is located in a recess in the clamping member exterior to the valve casing and on the opposite side of said diaphragm; by which means I am able to use an ordinary steel spring instead of a spring of brass or bronze, as the water is thus held out of contact with the spring and it is unnecessary to employ a non-rusting or non-corroding metal. My invention generally reduces the number of brass parts and also the number of machining operations to a minimum, without any decrease in the efficiency of the apparatus.

In Figs. 1 to 7 inclusive I have shown my invention embodied in a valve mechanism adapted particularly for use as a flushing valve. Referring to these figures, 1 represents the valve body, which is provided with a longitudinal passage 2, the said body having at one end a clamping member 3 on the outer face of which I preferably provide an annular seat 4 to receive a packing member hereinafter described. The valve body is provided at the opposite end with a threaded aperture 5 in which is screwed a bushing 6, preferably of brass or other suitable metal, which is provided at its outer end with a threaded nipple 7 and at its inner end with a short guiding sleeve 8. The bushing 6 is also preferably provided at its outer end with a polygonal recess 9 communicating with its central bore and adapted to receive a suitable wrench or tool for inserting the bushing. The valve body is also provided with an aperture 10 also screw threaded to receive a pipe 11 leading to the usual closed tank 12, this aperture being located preferably adjacent to the inlet end of the valve body. The valve body is also provided with a lateral outlet passage 13, adjacent to the other end of the body, which is connected in any well-known manner, as by the elbow connection 14 with the bowl 15. Within the longitudinal passage 2 of the valve body I provide an annular seat indicated at 16, which is located between the inlet and discharge ends and specifically between the tank connection 11 and the outlet passage 13. Within the passage 2, adjacent to the outlet passage 13, is a rotatably adjustable sleeve 17 preferably of brass, provided with a lateral water discharge aperture or apertures 18. This sleeve is provided adjacent to each end with a flange 19, 20 and at the inner end of the sleeve beyond the flange 19, the sleeve is provided with a valve seat 21 and an annular recess or shoulder surrounding the same which receives a gasket 22 adapted to fit against the internal seat 16 in the valve body. The outer end of the sleeve is substantially flush with the annular seat 4 of the valve body and a rubber diaphragm 23 having a central aperture 24 for the passage of the valve stem is placed in engagement with the end of the sleeve and said annular seat 4. This diaphragm is engaged by a clamping member 25 provided with bolt holes corresponding with bolt receiving recesses in the clamping member or flange 3 of the valve body, and is connected to the valve body by means of bolts and nuts (or screws) thereby forcing it against the diaphragm and clamping the edges of the diaphragm against the annular seat 4 and against the end of the sleeve, and crowding the sleeve endwise so as to firmly clamp the gasket 22 between the flange 19 of the sleeve and the annular seat or stop 16 in the valve body, thereby firmly holding the sleeve against rotation.

Figure 4:
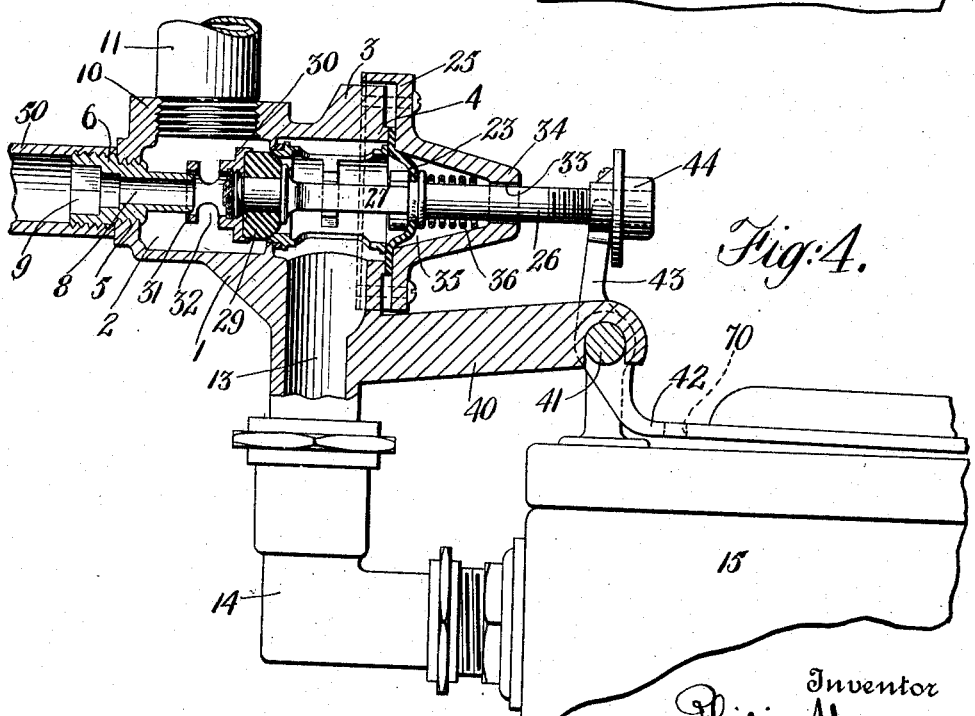
Fig. 4 is a similar view showing the inlet valve open and the outlet valve closed.

As will be seen especially from Figs. 3, 4 and 5, the sleeve 17 can be rotated and adjusted before the clamping bolts are tightened so as to bring the water aperture (or one of the water apertures) more or less into registration with the discharge passage 13 of the valve casing, so that the water passing through the valve casing will be throttled by this sleeve when the same is placed, for example, in the position indicated in Fig. 5. This throttling of the water can be made more or less effective by turning the sleeve more or less within the valve casing, without stopping the actual passage of the water through the valve, as the provision of the flanges 19, 20 provides an annular space between the walls of the sleeve and the interior of the annular passage through which the water can pass while its flow is necessarily impeded by more or less closing off the more direct flow through the lateral passage in the wall of the sleeve. I have shown a sleeve provided with two of these annular apertures 18 as this facilitates the assembly of the parts and makes the construction more uniform. It is obvious, however, that one aperture 18 would suffice.

26 represents the valve stem which extends longitudinally through the valve body, the sleeve 17 and the clamping member 25 and is provided with a yoke portion 27 at the part which lies within the sleeve 17 to provide guiding portions which engage guides 28 on the interior of the sleeve, as clearly shown in Figs. 5 and 6 for example. The valve stem is also provided with an outlet valve 29, preferably of rubber and of hemispherical shape, which is placed on a threaded portion of the valve stem and held in position by a clamping member 30, the outer end of which is in the form of a sleeve 31 and is adapted to fit over and be guided upon the portion 8 of the bushing 6 previously described. The sleeve 31 is provided with lateral openings 32 and at its inner end the sleeve carries a valve disk 32 of rubber or other suitable material, the edges of which are clamped between the clamping member 30 and the end of the threaded portion of the valve stem, so that this clamping member holds both the inlet valve 32 and the outlet valve 29 in position. The valve stem is also guided in an aperture 33 in the outer end of a conical extension 34 on the clamping plate 25, within which conical extension a recess 35 is formed exterior to the diaphragm 23 and in this recess is located a spring 36 which surrounds the valve stem and has its inner end bearing against the diaphragm. The diaphragm fits against a shoulder 37 on the valve stem (see Fig. 6) so that the pressure of the spring is transmitted directly through the diaphragm to the valve stem and valves and normally presses the inlet valve 32 against the end of the bushing 6 thus preventing the inlet of water to the valve casing. It will also be seen that the spring is contained in a chamber outside of the valve body and separated therefrom by the diaphragm 23 so that no water can get to the spring and consequently I am enabled to employ, where desired, a cheaper grade of spring, instead of being obliged to employ a spring formed of expensive non-rusting and non-corrodible metal as would otherwise be necessary.

Where my invention is employed in flushing valves of the type shown in Figs.

1 to 4, it is customary and desirable to have the valve stem operated by means of the seat, although obviously it can be operated in any other desired way. In the drawings I have shown the body of the valve provided with a brace arm indicated at 40, which has a recessed portion adapted to fit over the seat hinge pin 41 substantially as shown in my former Patent No. 1,185,307, dated May 30, 1916. 42 represents the hinge seat which is provided with an operating arm or lever 43 in the form of a yoke or fork which engages the inner end of a nut 44 on the valve stem 26 so as to move the valve stem lengthwise when the seat is depressed.

In the operation of this form of valve it will be understood that the water enters through the inlet pipe 50, the inlet being normally closed by the engagement of the inlet valve 32 with the end of the bushing 6. When the seat is depressed and the valve stem shifted endwise, the outlet valve 29 is brought into contact with the valve seat 21 at the end of the sleeve 17 and the inlet valve is opened, the water entering the valve body and passing up through the pipe 11 into the tank and compressing the air therein in the usual manner. When the seat is released the valve stem will be returned to normal position by the spring 36, thereby closing the inlet valve and moving the outlet valve away from the seat on the end of the sleeve. The water in the tank is now expelled with considerable force through the pipe 11 and passes through the sleeve 17, being throttled more or less according to the position of the sleeve and is discharged through the passage 13 to the bowl. As the water in the tank will compress the air therein to a pressure substantially corresponding to the pressure on the city main with which the pipe 50 is connected, and as the pressure carried on city mains varies in different cities and in different parts of cities, the adjustability of the sleeve 17 is very important in a valve of this character, as the sleeve can be adjusted so as to secure exactly the results desired regardless of variations in the water pressure, and the annoyance and inconvenience of handling water under high pressure which has precluded the use of this type of valve mechanism in some installations, is entirely obviated.

It will also be seen that by removing the bolts or screws holding the clamping member to the valve body, the valve stem, the sleeve 17 and the parts connected with the valve stem can be entirely withdrawn for examination and repair, new rubber valves can be inserted when desired and in case the valve seat on the end of the sleeve becomes injured a new sleeve can be inserted. It will also be noted that when it is desired to adjust the sleeve 17 this may be readily accomplished without disassembling the parts, by simply loosening the screws or bolts slightly and turning the valve stem, as the engagement between the guiding members of the valve stem and the sleeve will effect the rotation of the sleeve when the stem is turned. It will also be noticed that the valve stem is guided at three points,—by the bushing at the inlet end of the valve mechanism, by the aperture in the end of the conical portion of the clamping member, and centrally by the guiding engagement with the sleeve, so that the operation of the valves will be accurate at all times and strain upon the parts and undue wear upon the valves or unequal seating of the valves is entirely avoided. In order to facilitate the removal of the screws or bolts, in order to give access to the valve mechanism without disconnecting the main body from the water connections, I find it convenient to provide the seat hinge member with the two apertures 70, which are so located that when the seat is raised into vertical position they will be in alinement with the heads of the lower screws and thus permit a screw driver to be inserted through these openings for the removal of these screws, which would otherwise be somewhat difficult of access.

I wish it to be understood that my present invention is applicable to valves of various types and is not limited in its application to any particular style or arrangement of valve mechanism. For example, in Fig. 8 I have shown my invention applied to a valve mechanism which is adapted for use with what are termed frost-proof closets and is equally adapted for use with a hydrant. In this figure 101 represents the valve body provided with the inlet aperture 105 which is connected by the inlet pipe 150 with the water supply pipe 160 at a considerable distance below the ground. At the lower end of the pipe 150 I provide a frost proof connection somewhat similar to that shown in my former Patent No. 1,111,744, granted September 29, 1914, which consists in this instance of a casting 161 provided with an inlet valve seat 162, longitudinal bore 163, in which is located a piston member carrying the inlet valve 164 at its lower end and a guiding member 165 loosely fitting the said bore, a casting having also by a by-pass 166 and being also provided with a drain passage 167 extending from the longitudinal bore and connected by a pipe 168 with the sewer in the usual manner for draining the valve mechanism and pipe above the inlet valve when the latter is closed. The piston member is provided with a compressible washer 170 of rubber, of annular form which fits the bore and acts as a side valve to close the drain passage 167 when the inlet valve is open, in which position the parts are shown in Fig. 8. The other parts of the valve structure are substantially identical with those previously described except that the valve stem 126 is provided with an extension 175 connecting the piston member therewith, which extension lies within the inlet pipe 150. In this figure the apparatus is shown arranged for use with a frost-proof closet and the pipe 111 is to be understood as connected with the usual tank while the outlet passage 113 is connected by a pipe 114 with the closet bowl. The valve stem in this instance is shown as provided with a cap portion 144 to be acted upon by a lever 143 connected with the closet seat plate 142 which is hinged upon a pin passing through the hinge bearing provided on the valve body. Obviously, where this device is intended to be used as a hydrant, the pipe 111 will be omitted and the aperture therefore may be plugged or omitted in casting the valve body, and the discharge passage 113 may be provided with a draw-off pipe or cast in the form of a draw-off passage as may be desired. In this case a suitable lever or other means would be provided for lifting the valve stem into the position shown, and obviously the outer valve 129 would be dispensed with. In the construction shown in Fig. 8, as in the construction shown in the other figures, the valve casing is provided with a clamping member for closing the end of the casing and holding the diaphragm and the rotatably adjustable sleeve in position and the spring for actuating the valve stem is located in a recess in the clamping member exterior to the diaphragm, the various parts of the apparatus being numbered as in the other figures, with the exception of adding 100 to each of said numerals, so that their relative positions and operation may be clearly apparent.

What I claim and desire to secure by Letters Patent is:

1. In a valve mechanism the combination with a valve body provided with a water inlet, a tank connection and a water outlet, a normally closed inlet valve, and a normally open outlet valve, interposed between the tank connection and the outlet passage and means for operating said valves, of a rotatably adjustable sleeve within said valve body having a lateral discharge passage adjacent to the discharge passage of the main body, whereby said sleeve may be adjusted rotatably to throttle the discharge of water through the valve casing, and means operable from the exterior of the valve body by which said sleeve may be rotated without disassembling the parts of the valve mechanism.

2. In a valve mechanism the combination with a valve body provided with a longitudinal passage, a water inlet, a tank connection and a water outlet, a normally closed inlet valve, a normally open outlet valve interposed between the tank connection and the water outlet, a rotatably adjustable sleeve in said longitudinal passage, provided with a lateral discharge orifice, a clamping member for closing the end of said longitudinal passage and engaging one end of said sleeve to hold it in adjusted position and a valve stem carrying said valves and extending through said sleeve, and clamping member, and means operable from the exterior of the valve body for rotating said sleeve when said clamping member is loosened, without disassembling the parts of the valve mechanism.

3. In a valve mechanism the combination with a valve body provided with a longitudinal passage, a water inlet, a tank connection and a water outlet, a normally closed inlet valve, a normally open outlet valve interposed between the tank connection and the water outlet, a rotatably adjustable sleeve in said longitudinal passage, provided with a lateral discharge orifice, a clamping member for closing the end of said longitudinal passage and engaging one end of said sleeve to hold it in adjusted position and a valve stem carrying said valves and extending through said sleeve, and clamping member, said sleeve and said valve stem having interengaging guiding portions, for guiding the valve stem, and for permitting the rotatable adjustment of said sleeve by means of said valve stem when said clamping member is loosened.

4. In a valve mechanism the combination with a valve body having a longitudinal passage, an inlet aperture, a tank connection, and an outlet aperture communicating with said passage and an annular seat interposed between the tank connection and discharge aperture, of a rotatably adjustable sleeve, in said passage having one end adjacent to said seat, and provided with a lateral discharge orifice, a clamping member for closing said passage and engaging said sleeve to force it into engagement with said seat and hold it in adjusted position, and a valve stem extending through said passage and sleeve and provided with inlet and outlet valves, said valve stem having a part extending outside of the valve body, said rotatably adjustable sleeve and said valve stem having interengaging portions connecting them for joint rotation, without interfering with the longitudinal movement of the valve stem, whereby said sleeve can be adjusted by turning the valve stem when said clamping member is loosened, without disassembling the parts of the valve mechanism.

5. In a valve mechanism the combination with a valve body, provided with a longitudinal passage, an annular seat in said passage, an inlet aperture and tank aperture communicating with said passage, on one side of said seat and an outlet passage communicating with said passage on the opposite side of said seat, a detachable and rotatable sleeve in said passage engaging said seat, and provided with a lateral orifice, adjacent to the said outlet passage, said sleeve being provided with a valve seat at its inner end, and having its outer end adjacent to the outer end of the valve body, a clamping member closing the longitudinal passage of said body and engaging said sleeve to hold the latter in its adjusted position, a valve stem extending through the said longitudinal passage and through said sleeve, an inlet valve on said valve stem for closing the inlet aperture and an outlet valve on said stem for engaging the valve seat at the end of said sleeve, said valve stem extending to the exterior of the valve body, said valve stem and sleeve having interengaging portions connecting them for joint rotation, without interfering with the longitudinal movement of the stem, whereby said sleeve can be adjusted by turning the valve stem, when the clamping member is loosened, without disassembling the parts of the valve mechanism.

6. In a valve mechanism the combination with a valve body having a longitudinal passage, a tank connection and an outlet passage communicating laterally with said passage and an inlet opening at one end of said passage, a hollow bushing secured in said inlet opening and provided exteriorly of the valve body with a threaded nipple, and provided interiorly of the valve body with a guiding sleeve, a valve stem extending longitudinally of said passage, and having a guiding portion engaging the guiding sleeve of the bushing, a valve carried by said valve stem for engaging the end of said bushing and closing the inlet opening therethrough, a valve seat interposed between the tank connection and the outlet opening and an outlet valve on said valve stem for engaging the said valve seat when the inlet valve is opened.

7. In a valve mechanism the combination with a valve body, having a longitudinal passage therethrough, and an annular seat located in said passage, said body having a tank aperture and discharge aperture communicating with said passage on opposite sides of said seat, and an inlet passage communicating with the said passage adjacent to the tank aperture, of a rotatably adjustable sleeve located in said passage having one end adjacent to said seat, and being provided with a lateral throttling discharge opening adjacent to said discharge aperture of said valve body, a diaphragm for closing one end of said longitudinal passage, and engaging the outer end of said sleeve, said sleeve being provided with a valve seat at its inner end, a valve stem extending through the said longitudinal passage and through said sleeve, and through an aperture in said diaphragm, and provided with a shouldered portion adjacent to the diaphragm, an inlet valve on said stem, an outlet valve on said stem adapted to engage the valve seat on said sleeve, a clamping member for clamping the diaphragm against the valve body and the end of said sleeve to close said body and hold the sleeve in its adjusted position, said clamping member having a spring recess, a spring in said recess surrounding the valve stem, and engaging the diaphragm adjacent to said shoulder, and normally holding the inlet valve closed and the outlet valve open.

8. In a valve mechanism the combination with a valve body, having a longitudinal passage provided with an internal seat, and having a water inlet and tank connection on one side of said seat and a water outlet on the other side of said seat all communicating with said passage, a rotatably adjustable sleeve located in one end of said passage and provided with a valve seat at its inner end and having a lateral discharge aperture, clamping means for securing said sleeve against said seat in its adjusted position, a diaphragm interposed between said clamping means and said sleeve and closing the end of said longitudinal passage, said sleeve being provided internally with guiding portions, a valve stem extending through said clamping means, said diaphragm, said sleeve and said longitudinal passage, provided with a valve for closing the inlet passage and a valve for engaging the seat at the inner end of the sleeve, said valve stem having a yoke portion provided with guiding portions for engaging the guiding devices in said sleeve, said clamping means being provided with a spring recess exterior to said diaphragm and said valve stem having a shoulder portion adjacent to said diaphragm on the inner side thereof, and a spring in said recess surrounding the valve stem and engaging the diaphragm adjacent to said shoulder portion of the stem.

9. In a valve mechanism, the combination with a valve body having a longitudinal passage, and provided adjacent to one end with an inlet aperture and a tank aperture, and adjacent to the other end with a discharge aperture, a rotatably adjustable sleeve located in said passage, adjacent to the discharge aperture, and provided with a lateral discharge orifice, a diaphragm closing the longitudinal passage in the valve body at one end of the same, and engaging one end of said adjustable sleeve, a clamping member engaging marginal portions of the diaphragm, and clamping them against said sleeve, to hold said sleeve against rotation, a valve stem extending through said passage and sleeve and through said diaphragm, and provided with inlet and outlet valves, a spring for said valve stem located on the outer side of said diaphragm, said sleeve and valve stem being provided with interengaging portions connecting them for joint rotation without interfering with the longitudinal movement of the valve stem.

10. In a valve mechanism the combination with a valve body having a longitudinal passage, an inlet opening at one end, a clamping face at the opposite end surrounding said passage and a tank aperture and a discharge aperture communicating laterally with said passage, said body having a valve seat located between the tank aperture and the outlet aperture, a hollow bushing engaging the inlet aperture of the valve body provided outside of the valve body with a threaded nipple and provided within said body with a tubular guiding portion, a rotatably adjustable sleeve located in the other end of said longitudinal passage and provided with a lateral throttling opening adjacent to the water outlet of the valve body, a valve stem extending longitudinally through said passage and sleeve and provided with a tubular guiding portion engaging the bushing, and with an inlet valve for engaging the said bushing, and an outlet valve for engaging the valve seat between the tank aperture and outlet aperture, said valve stem having guiding portions engaging guiding devices on the interior of said sleeve, a diaphragm engaging the clamping face of the valve body and having an opening engaging the valve stem, a clamping plate for engaging said diaphragm and forcing it against the valve body and the end of the sleeve, clamping devices for uniting said plate to the valve body, said clamping plate being provided with a spring receiving recess exterior to said diaphragm and a spring in said recess operatively connected with the valve stem.

11. In a valve mechanism the combination with a valve body provided with a longitudinal passage, an inlet aperture, tank aperture, and discharge aperture communicating with said passage and having a valve seat interposed between the tank aperture and the discharge aperture, the valve stem extending through said passage, an inlet valve carried thereby, an outlet valve carried thereby for engaging said valve seat, a diaphragm closing the end of said passage and having an aperture for the passage of said valve stem, a clamping member engaging said diaphragm and clamping devices for connecting said clamping member with the valve body.

12. In a valve mechanism the combination with a valve body provided with a longitudinal passage, an inlet aperture, tank aperture, and discharge aperture communicating with said passage and having a valve seat interposed between the tank aperture and the discharge aperture, the valve stem extending through said passage, an inlet valve carried thereby, an outlet valve carried thereby for engaging said valve seat, a diaphragm closing the end of said passage and having an aperture for the passage of said valve stem, a clamping member engaging said diaphragm and clamping devices for connecting the clamping member with the valve body, said clamping member being provided with a spring retaining recess exterior to said diaphragm, and an aperture for the passage of the valve stem in the outer end of said recessed portion, and a spring located in said recess and operatively engaging said valve stem.

In testimony whereof I affix my signature.

PHILIP HAAS.

Copies of this patent may be obtained for five cents each, by addressing the "Commissioner of Patents, Washington, D. C."